A coupling for axle-suspended installation of a direct drive motor, comprises a wheel axle side adapting flange coaxially fixed with a wheel axle and a motor side adapting flange coaxially fixed with the rotor shaft of a motor, an elastic support rotating assembly, wherein the elastic support rotating assembly is radially connected between the wheel axle side adapting flange and the motor side adapting flange so that the wheel axle side adapting flange and the motor side adapting flange can be coaxially and rotatably connected and bear the weight of the motor along the radial direction

United States Patent
Xiao et al.

(10) Patent No.: US 12,122,430 B2
(45) Date of Patent: Oct. 22, 2024

(54) COUPLING FOR AXLE-SUSPENDED INSTALLATION OF DIRECT DRIVE MOTOR AND STIFFNESS DESIGN METHOD THEREFOR

(71) Applicant: Zhuzhou Times New Material Technology Co., Ltd., Hunan (CN)

(72) Inventors: Guanghui Xiao, Hunan (CN); Caichun He, Hunan (CN); Fengchen Tu, Hunan (CN); Hao Li, Hunan (CN)

(73) Assignee: Zhuzhou Times New Material Technology Co., Ltd., Hunan (CN)

( * ) Notice: Subject to any disclaimer, the term of this patent is extended or adjusted under 35 U.S.C. 154(b) by 434 days.

(21) Appl. No.: 17/624,352

(22) PCT Filed: Nov. 10, 2020

(86) PCT No.: PCT/CN2020/127764
§ 371 (c)(1),
(2) Date: Jan. 3, 2022

(87) PCT Pub. No.: WO2021/098549
PCT Pub. Date: May 27, 2021

(65) Prior Publication Data
US 2022/0348235 A1    Nov. 3, 2022

(30) Foreign Application Priority Data
Nov. 22, 2019   (CN) .......................... 201911155297.8

(51) Int. Cl.
*B61C 9/38*       (2006.01)
*F16D 3/12*       (2006.01)
(Continued)

(52) U.S. Cl.
CPC .................. *B61C 9/38* (2013.01); *F16D 3/12* (2013.01); *F16D 3/68* (2013.01); *H02K 7/003* (2013.01); *H02K 7/006* (2013.01)

(58) Field of Classification Search
CPC .... B61C 9/38; F16D 3/12; F16D 3/68; H02K 7/003; H02K 7/006
(Continued)

(56) References Cited

U.S. PATENT DOCUMENTS

| | | | | |
|---|---|---|---|---|
| 1,561,476 A | * | 11/1925 | Masury | F16D 3/68 464/83 |
| 1,679,992 A | * | 8/1928 | Short | F16D 3/68 464/73 |
| 3,859,929 A | * | 1/1975 | Korn | B61C 9/44 |

FOREIGN PATENT DOCUMENTS

| | | |
|---|---|---|
| CN | 205226110 | 5/2016 |
| CN | 106364496 | 2/2017 |

(Continued)

OTHER PUBLICATIONS

"International Search Report (Form PCT/ISA/210) of PCT/CN2020/127764," mailed on Jan. 20, 2021, with English translation thereof, pp. 1-4.

*Primary Examiner* — Greg Binda
(74) *Attorney, Agent, or Firm* — JCIP GLOBAL INC.

(57) ABSTRACT

A coupling for axle-suspended installation of a direct drive motor, comprises a wheel axle side adapting flange coaxially fixed with a wheel axle and a motor side adapting flange coaxially fixed with the rotor shaft of a motor, an elastic support rotating assembly, wherein the elastic support rotating assembly is radially connected between the wheel axle side adapting flange and the motor side adapting flange so that the wheel axle side adapting flange and the motor side adapting flange can be coaxially and rotatably connected and bear the weight of the motor along the radial direction (Continued)

through the elastic support rotating assembly, and the wheel axle side adapting flange and the motor side adapting flange are circumferentially elastically connected. It also provides stiffness design method of coupling for axle-suspended installation of direct drive motor.

6 Claims, 4 Drawing Sheets

(51) Int. Cl.
     *F16D 3/68*         (2006.01)
     *H02K 7/00*       (2006.01)

(58) Field of Classification Search
     USPC ................................................ 464/76, 85
     See application file for complete search history.

(56) References Cited

FOREIGN PATENT DOCUMENTS

| | | | | |
|---|---|---|---|---|
| CN | 110027575 | | 7/2019 | |
| CN | 110671436 | | 1/2020 | |
| DE | 580 482 C | * | 7/1933 | ............ 464/85 |
| IT | 1237231 | | 5/1993 | |
| JP | 4243149 | | 3/2009 | |
| WO | 2006051046 | | 5/2006 | |

* cited by examiner

COUPLING FOR AXLE-SUSPENDED INSTALLATION OF DIRECT DRIVE MOTOR AND STIFFNESS DESIGN METHOD THEREFOR

CROSS-REFERENCE TO RELATED APPLICATION

This application is a 371 of international application of PCT application serial no. PCT/CN2020/127764, filed on Nov. 10, 2020, which claims the priority benefit of China application no. 201911155297.8, filed on Nov. 22, 2019. The entirety of each of the above mentioned patent applications is hereby incorporated by reference herein and made a part of this specification.

TECHNICAL FIELD

The present invention relates to a coupling for axle-suspended installation of a direct drive motor and a stiffness design method therefor, and belongs to the technical field of couplings.

BACKGROUND

The power truck of a rail traffic vehicle is mainly powered by a traction motor to realize wheel rolling motion. To meet the requirements of miniaturization and high transmission efficiency of power trucks of a next generation of rail vehicles, the direct drive transmission system of a traction motor has become a research hotspot of companies and research institutions. The system removes the transmission device such as gearbox, and the traction motor will be directly connected to the wheel axle to provide power, thus having the advantages of high transmission efficiency, little maintenance and low noise, but at the same time, the motor is also needed to bear more vibration and shock from the wheel rail after being integrated with the wheel axle. To reduce the impact of vibration and shock on traction motors, most of the traction motors in China are installed through elastic suspension, and the installation methods comprise "axle suspension" that the motor is directly installed on the wheel axle through an elastic suspension device and "frame suspension" that the motor is installed on the truck frame and then connected with the wheel axle through an elastic suspension device. "Axle suspension" receives attention due to the characteristics of simple and compact structure and good economy, but in this way, most of the weight of the traction motor will fall on the wheel axle through the elastic suspension device, thus bringing a great test for the structural reliability and performance stability of the elastic suspension device. A patent CN106364496A discloses an elastic suspension device for axle-hung installation of a motor, comprising a motor end connecting ring connected with the output end of a rotor of an axle hung motor, an axle end connecting ring connected with the axle and an elastic element, wherein the peripheral walls of the motor end connecting ring and the axle end connecting ring are provided with lug bosses in staggered distribution at intervals, and the elastic element is wrapped and fixed to the periphery of the lug bosses and provided with wedge blocks inserted into gaps between adjacent lug bosses. A patent CN110027575A discloses a connector, comprising an elastomer unit having two pieces to be connected, wherein each piece to be connected is provided with connecting blocks oriented towards the axis of the piece to be connected and arranged in an encircling mode. The two pieces to be connected are arranged relatively at a staggered angle along the axial direction, and an elastic ring is sleeved on the periphery of each connecting block.

In the above patents, the radial load is shear force borne by wedge rubber blocks, so the radial bearing capacity is insufficient, the rubber blocks are easy to damage, and the service life is short. The rubber blocks will creep under heavy load for a long time, which increases the system failure risk of the motor. Moreover, in the above patents, the motor side connecting structure and the wheel axle side connecting structure cannot be aligned, and because the rubber blocks need to be installed through pre-compression, the rubber blocks in the elastic rings cannot be installed in place at the same time, and the installation needs to be performed with the aid of complex special fixtures, thus having the problem of extremely inconvenient installation and maintenance.

SUMMARY OF INVENTION

The coupling for axle-suspended installation of a direct drive motor and the stiffness design method therefor provided by the present invention can obtain better damping buffering effects while achieving great radial bearing capacity, reduce failure risk, extend the service life of metal-rubber parts, improve the use reliability of the coupling, easily realize the alignment connection of a wheel axle side adapting flange and a motor side adapting flange and enhance the installation reliability and convenience of the coupling, and the installation process is convenient and simple, which is convenient for maintenance and replacement.

To achieve the above purpose, the present invention adopts the following technical solution:

A coupling for axle-suspended installation of a direct drive motor, comprises a wheel axle side adapting flange coaxially fixed with a wheel axle and a motor side adapting flange coaxially fixed with the rotor shaft of a motor, and is characterized by further comprising an elastic support rotating assembly, wherein the elastic support rotating assembly is radially connected between the wheel axle side adapting flange and the motor side adapting flange so that the wheel axle side adapting flange and the motor side adapting flange can be coaxially and rotatably connected and bear the weight of the motor along the radial direction through the elastic support rotating assembly, and the wheel axle side adapting flange and the motor side adapting flange are circumferentially elastically connected.

Preferably, the wheel axle side adapting flange comprises a wheel axle sleeve sleeved on the wheel axle by interference fit, connecting blocks I used for circumferential elastic connection with the motor side adapting flange, and a radial connecting ring, wherein the connecting blocks I are uniformly distributed along the periphery of the wheel axle sleeve and connected with the wheel axle sleeve through the radial connecting ring.

Preferably, the motor side adapting flange comprises a connecting cylinder coaxially and fixedly connected with the rotor shaft of the motor and connecting blocks II used for circumferential elastic connection with the wheel axle side adapting flange, wherein the connecting blocks II are fixed on the periphery of the connecting cylinder and uniformly distributed on the periphery of the connecting cylinder in one-to-one correspondence to the connecting blocks I, and the connecting blocks II and the corresponding connecting blocks I are circumferentially separated and elastically connected.

Preferably, the connecting blocks II and the corresponding connecting blocks I are elastically connected through metal-rubber parts, and the metal-rubber parts are circumferentially compressed between the connecting blocks II and the corresponding connecting blocks I.

Preferably, the metal-rubber parts comprise arc-shaped rubber blocks and metal connectors vulcanized and bonded on both arc-shaped ends of the rubber blocks, the connecting blocks I and the connecting blocks II are respectively axially positioned and fixedly connected with the metal connectors through bolts, and the rubber blocks are circumferentially arranged and compressed between two metal connectors.

Preferably, the metal connectors are in right-angled fit and contact with the connecting blocks I and the connecting blocks II, the metal connectors are provided with radial bulges, the connecting blocks I and the connecting blocks II are respectively provided with radial grooves matched with the radial bulges, the radial grooves are matched with the radial bulges to axially position the metal connectors respectively with the connecting blocks I and the connecting blocks II, and partition plates arranged radially are vulcanized in the rubber blocks.

Preferably, the connecting cylinder is sleeved with a radial support locating cylinder, the connecting blocks II are arranged on the peripheral surface of the radial support cylinder and integrated with the radial support cylinder, the axial height of the radial support locating cylinder is greater than that of the connecting cylinder, and an elastic support rotating assembly is coaxially installed in the inner cavity of the radial support locating cylinder and sleeved on the wheel axle sleeve.

Preferably, the elastic support rotating assembly comprises an elastic support cylinder installed in the inner cavity of the radial support locating cylinder by circumferential location fit, a bearing pedestal installed in the inner cavity of the elastic support cylinder by circumferential location fit and a bearing compressed in the bearing pedestal, wherein the inner ring of the bearing is sleeved on the wheel axle sleeve.

Preferably, the outer wall of the elastic support cylinder is provided with axial locating bulges I, the inner wall of the radial support locating cylinder is provided with axial grooves I matched with the locating bulges I, the inner wall of the elastic support cylinder is provided with axial locating bulges II, the bearing pedestal is provided with axial grooves II matched with the locating bulges II, the locating bulges I are matched with the axial grooves I to make the elastic support cylinder in circumferential location fit with the radial support locating cylinder, the locating bulges II are matched with the axial grooves II to make the elastic support cylinder in circumferential location fit with the bearing pedestal, the locating bulges I and the locating bulges II are uniformly and alternately distributed along the circumferential direction of the elastic support cylinder, and the elastic support cylinder is made of spring steel.

The stiffness design method for the coupling for axle-suspended installation of a direct drive motor is characterized in that the initial stiffness of circumferential elastic connection between the wheel axle side adapting flange and the motor side adapting flange is designed according to the damping buffering requirements of the coupling for axle-suspended installation of a direct drive motor in the torsional direction in use, and the stiffness of the elastic support rotating assembly is designed according to the radial bearing and damping requirements of the coupling for axle-suspended installation of a direct drive motor in use.

The present invention has the following beneficial effects:

In the present invention, the wheel axle side adapting flange and the motor side adapting flange are radially connected and circumferentially elastically connected through the elastic support rotating assembly, and the weight of the motor is borne through the elastic support rotating assembly along the radial direction, which enhances the radial bearing capacity and has no influence on the torsional direction. The present invention solves the problem that the existing coupling has small radial bearing capacity and thus cannot be suitable for axle-suspended installation of a direct drive motor, enhances the radial bearing capacity of the coupling through the elastic support rotating assembly, ensures the radial damping effect through the elastic support rotating assembly, and can obtain better damping buffering effects while achieving great radial bearing capacity.

The wheel axle side adapting flange and the motor side adapting flange are circumferentially elastically connected, and the circumferential elastic connection of the two flanges is used for damping buffering in the torsional direction, which solves the problem that it is difficult for the existing coupling to take into account bearing and damping buffering in two directions at the same time by rubber elastomers. The circumferential elastic connection is realized by connection between metal-rubber parts with the connecting piece I and the connecting piece II, the elastic support rotating assembly is used to bear the weight of the motor and mitigate radial vibration, and the metal-rubber parts are used to reduce vibration in the torsional direction so that bearing and damping buffering of the coupling in two directions are set separately and do not interfere with each other. When the motor is not working, the rubber blocks are unstressed, thus reducing the creeping and aging degree of the rubber blocks. When the motor is working, the rubber blocks are only subjected to extrusion force rather than shear force so that the creep of the rubber blocks is reduced, thus reducing system failure risks, extending the service life of metal-rubber parts and improving the use reliability of the coupling.

The elastic support rotating assembly is radially connected between the wheel axle side adapting flange and the motor side adapting flange, and can radially position the wheel axle side adapting flange and the motor side adapting flange, which easily realizes the alignment connection of the wheel axle side adapting flange and the motor side adapting flange and enhances the installation reliability and convenience of the coupling.

A plurality of metal-rubber parts are used in the coupling, and each metal-rubber part is installed and positioned through matching of the radial bulge and the radial groove. The metal-rubber parts are installed separately and not connected with each other. Because the wheel axle side adapting flange and the motor side adapting flange can rotate relatively, only the last metal-rubber part needs to be pre-compressed in the installation process of the plurality of metal-rubber parts. After installation, the pre-compression of each metal-rubber part can be realized through circumferential elastic stability. The installation process is convenient and simple, and the metal-rubber parts can be installed and removed separately, which is convenient for maintenance and replacement.

DESCRIPTION OF EMBODIMENTS

Embodiments of the present invention are described in details below in combination with FIG. 1 to FIG. 7.

Figure 1:
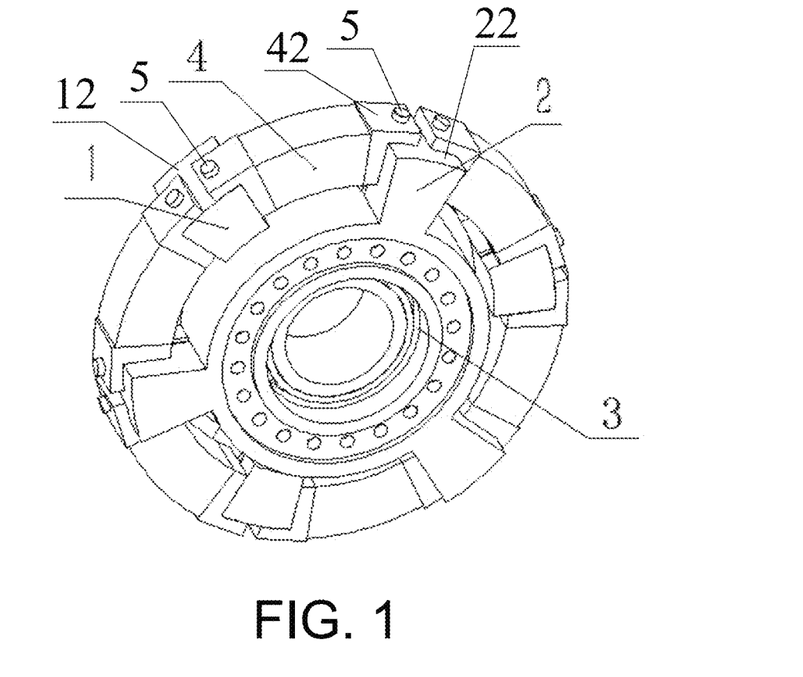
FIG. 1 is a structural schematic diagram of a coupling for axle-suspended installation of a direct drive motor in an embodiment.
Figure 5:
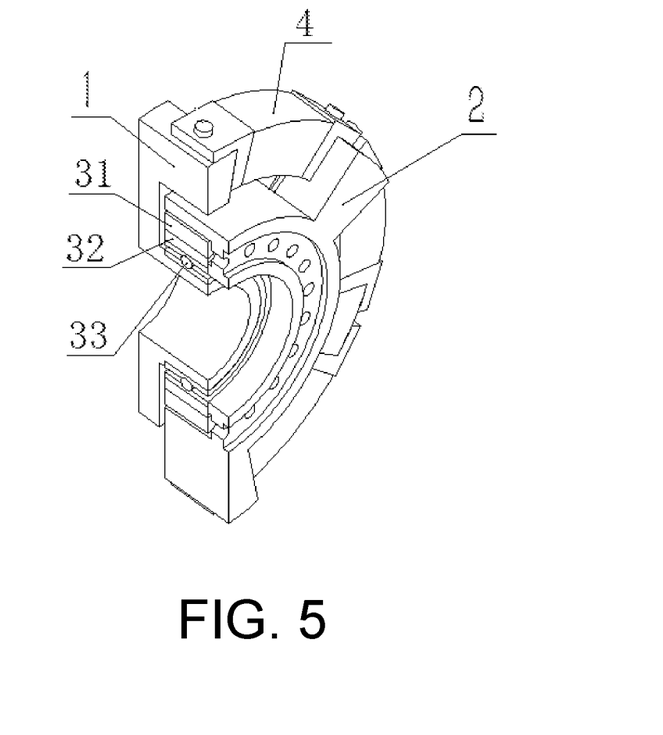
FIG. 5 is a half section view of a coupling for axle-suspended installation of a direct drive motor.

A coupling for axle-suspended installation of a direct drive motor, comprises a wheel axle side adapting flange 1 coaxially fixed with a wheel axle and a motor side adapting flange 2 coaxially fixed with the rotor shaft of a motor, and is characterized by further comprising an elastic support rotating assembly 3, wherein the elastic support rotating assembly 3 is radially connected between the wheel axle side adapting flange 1 and the motor side adapting flange 2 so that the wheel axle side adapting flange 1 and the motor side adapting flange 2 can be coaxially and rotatably connected and bear the weight of the motor along the radial direction through the elastic support rotating assembly 3, and the wheel axle side adapting flange 1 and the motor side adapting flange 2 are circumferentially elastically connected.

In the present invention, the wheel axle side adapting flange 1 and the motor side adapting flange 2 are radially connected and circumferentially elastically connected through the elastic support rotating assembly 3, and the weight of the motor is borne through the elastic support rotating assembly 3 along the radial direction, which enhances the radial bearing capacity and has no influence on the torsional direction. The present invention solves the problem that the existing coupling has small radial bearing capacity and thus cannot be suitable for axle-suspended installation of a direct drive motor, enhances the radial bearing capacity of the coupling through the elastic support rotating assembly 3, ensures the radial damping effect through the elastic support rotating assembly 3, and can obtain better damping buffering effects while achieving great radial bearing capacity. The wheel axle side adapting flange 1 and the motor side adapting flange 2 are circumferentially elastically connected, and the circumferential elastic connection of the two flanges is used for damping buffering in the torsional direction, which solves the problem that it is difficult for the existing coupling to take into account bearing and damping buffering in two directions at the same time by the rubber elastomers. The elastic support rotating assembly is used to bear the weight of the motor and mitigate radial vibration, and circumferential elastic connection is used to reduce vibration in the torsional direction so that bearing and damping buffering of the coupling in radial and circumferential directions are set separately and do not interfere with each other, thus reducing system failure risks, extending the service life of metal-rubber parts and improving the use reliability of the coupling. The elastic support rotating assembly 3 is radially connected between the wheel axle side adapting flange 1 and the motor side adapting flange 2, and can radially position the wheel axle side adapting flange 1 and the motor side adapting flange 2, which easily realizes the alignment connection of the wheel axle side adapting flange and the motor side adapting flange and enhances the installation reliability and convenience of the coupling.

Figure 2:
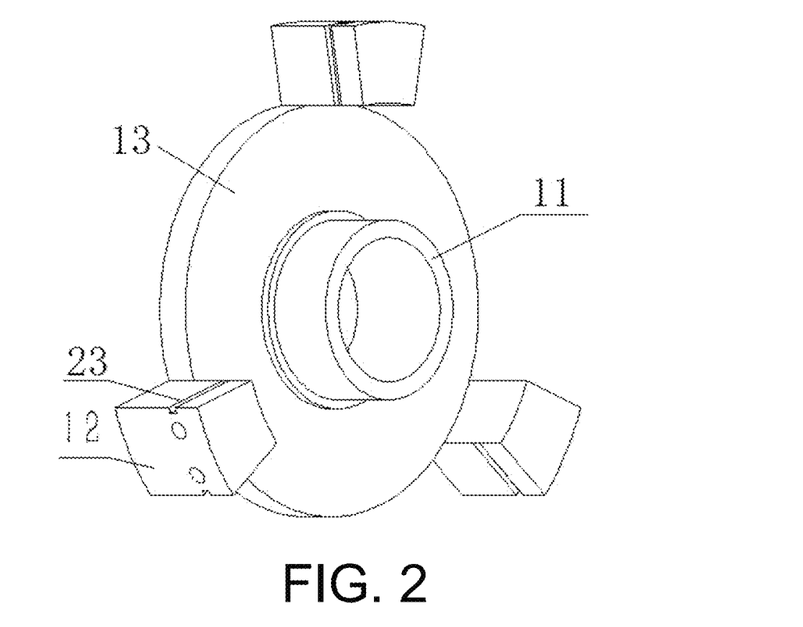
FIG. 2 is a structural schematic diagram of a wheel axle side adapting flange.

The wheel axle side adapting flange 1 comprises a wheel axle sleeve 11 sleeved on the wheel axle by interference fit, connecting blocks I 12 used for circumferential elastic connection with the motor side adapting flange 2, and a radial connecting ring 13, wherein the connecting blocks I 12 are uniformly distributed along the periphery of the wheel axle sleeve 11 and connected with the wheel axle sleeve 11 through the radial connecting ring 13. The wheel axle sleeve 11 is used for connection with the wheel axle and radially connected with the motor side adapting flange 2 so that the wheel axle side adapting flange 1 and the motor side adapting flange 2 are coaxially connected. The connecting blocks I 12 are circumferentially elastically connected with the motor side adapting flange 2 and have simple structure so that radial connection and circumferential connection of the wheel axle side adapting flange 1 are easy to realize.

Figure 3:
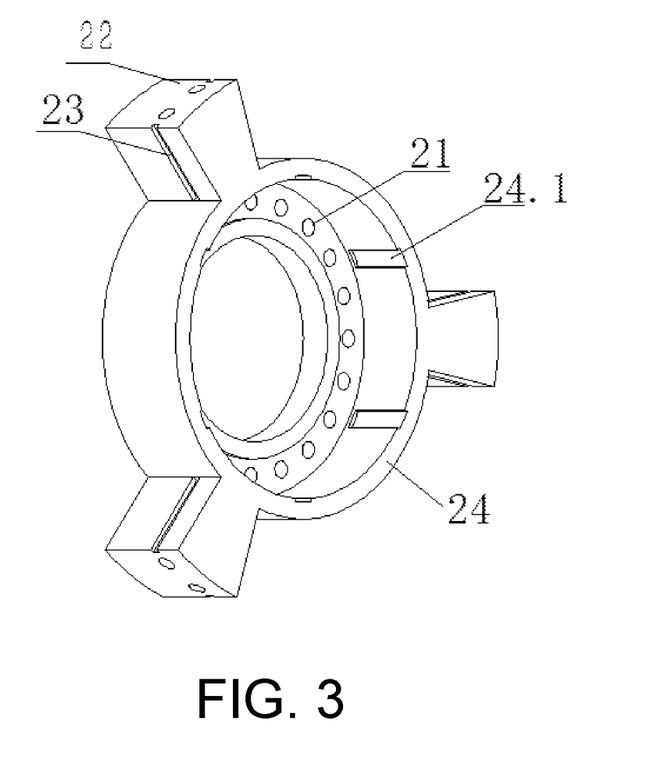
FIG. 3 is a structural schematic diagram of a motor side adapting flange.

The motor side adapting flange 2 comprises a connecting cylinder 21 coaxially and fixedly connected with the rotor shaft of the motor and connecting blocks II 22 used for circumferential elastic connection with the wheel axle side adapting flange 1, wherein the connecting blocks II 22 are fixed on the periphery of the connecting cylinder 21 and uniformly distributed on the periphery of the connecting cylinder 21 in one-to-one correspondence to the connecting blocks I 12, and the connecting blocks II 22 and the corresponding connecting blocks I 12 are circumferentially separated and elastically connected. The connecting cylinder 21 is coaxially connected with the rotor shaft of the motor, and the connecting blocks II 22 are circumferentially elastically connected with the connecting blocks I 12 so that the wheel axle side adapting flange 1 and the motor side adapting flange 2 are circumferentially elastically connected.

Figure 4:
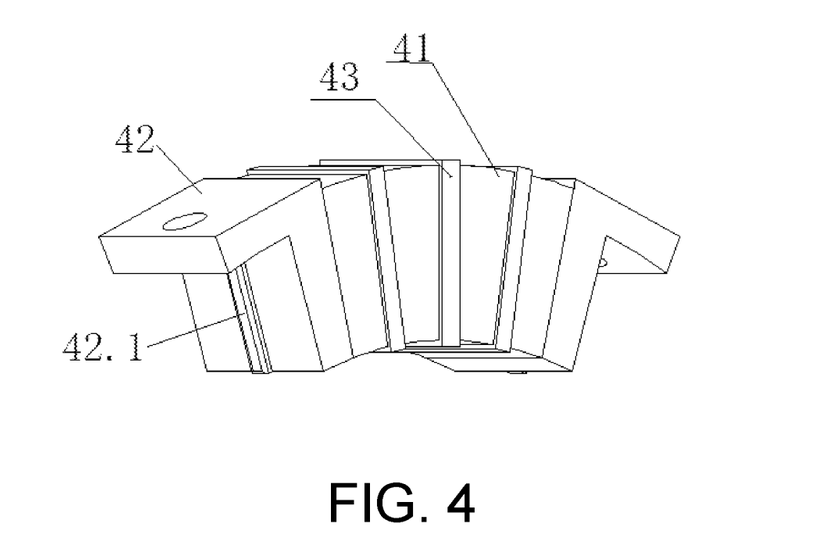
FIG. 4 is a structural schematic diagram of a metal-rubber part.

The connecting blocks II 22 and the corresponding connecting blocks I 12 are elastically connected through metal-rubber parts 4, and the metal-rubber parts 4 are circumferentially compressed between the connecting blocks II 22 and the corresponding connecting blocks I 12. The metal-rubber parts 4 are compressed between the connecting blocks II 22 and the connecting blocks 12 to provide circumferential elasticity for torsion of the coupling. When the motor is not working, the metal-rubber parts 4 are unstressed, thus reducing the creeping and aging degree of the rubber. When the motor is working, the metal-rubber parts 4 are only subjected to extrusion force rather than shear force so that the creep of the rubber is reduced, thus reducing system failure risks, extending the service life of metal-rubber parts and improving the use reliability of the coupling.

The metal-rubber parts 4 comprise arc-shaped rubber blocks 41 and metal connectors 42 vulcanized and bonded on both arc-shaped ends of the rubber blocks 41, the connecting blocks I 12 and the connecting blocks II 22 are respectively axially positioned and fixedly connected with the metal connectors 42 through bolts 5, and the rubber blocks 41 are circumferentially arranged and compressed between two metal connectors 42. The metal connectors 42 are respectively connected with the connecting blocks I 12 and the connecting blocks II 22 to ensure the reliability of the connecting structure between the metal-rubber parts 4 and the wheel axle side adapting flange 1 and the motor side adapting flange 2. The rubber blocks 41 are vulcanized between two metal connectors 42 to provide circumferential elasticity. The circumferential stiffness of the coupling can be changed by changing the initial stiffness of the rubber blocks 41 so as to enable the coupling to meet different damping buffering requirements. When the motor is not working, the rubber blocks 41 are unstressed, thus reducing the creeping and aging degree of the rubber blocks 41. When the motor is working, the rubber blocks 41 are only subjected to extrusion force rather than shear force so that the creep of the rubber blocks 41 is reduced, thus reducing system failure risks, extending the service life of metal-rubber parts and improving the use reliability of the coupling.

The metal connectors 42 are in right-angled fit and contact with the connecting blocks I 12 and the connecting blocks II 22, the metal connectors 42 are provided with radial bulges 42.1, the connecting blocks I 12 and the connecting blocks II 22 are respectively provided with radial grooves 23 matched with the radial bulges 42.1, the radial grooves 23 are matched with the radial bulges 42.1 to axially position the metal connectors 42 respectively with the connecting blocks I 12 and the connecting blocks II 22, and partition plates 43 arranged radially are vulcanized in the rubber blocks 41. As shown in figures, the connecting blocks I 12 and the connecting blocks II 22 are respectively provided with radial grooves 23, while the metal connectors 42 are respectively provided with radial bulges 42.1. When the metal-rubber parts 4 are installed, the radial bulges 42.1 are aligned with the radial grooves 23, and the metal-rubber parts 4 are radially compressed between the connecting blocks I 12 and the connecting blocks II 22 so that the metal-rubber parts 4 are axially positioned with the connecting blocks I 12 and the connecting blocks II 22 and then fastened by bolts 5. The radial bulges 42.1 are matched with the radial grooves 23, and the metal connectors 42 are in right-angled fit and contact with the connecting blocks I 12 and the connecting blocks II 22, which can ensure that the metal-rubber parts 4 can be quickly installed in place and the installation structure is firm and reliable, so as to improve the structure stability and reliability of the coupling. The partition plates 43 are arranged to improve the stiffness of the rubber blocks 41.

The connecting cylinder 21 is sleeved with a radial support locating cylinder 24, the connecting blocks II 22 are arranged on the peripheral surface of the radial support cylinder 24 and integrated with the radial support cylinder 24, the axial height of the radial support locating cylinder 24 is greater than that of the connecting cylinder 21, and an elastic support rotating assembly 3 is coaxially installed in the inner cavity of the radial support locating cylinder 24 and sleeved on the wheel axle sleeve 11. The radial support locating cylinder 24 is used for positioning the elastic support rotating assembly 3, the elastic support rotating assembly 3 is positioned between the wheel axle sleeve 11 and the radial support locating cylinder 24, and the axial height of the radial support locating cylinder 24 is greater than that of the connecting cylinder 21 so that the inner cavity of the radial support locating cylinder 24 has space for installing the support rotating assembly 3, and the installation of the support rotating assembly 3 is convenient and simple, which can effectively improve the assembly efficiency of the coupling.

Figure 6:
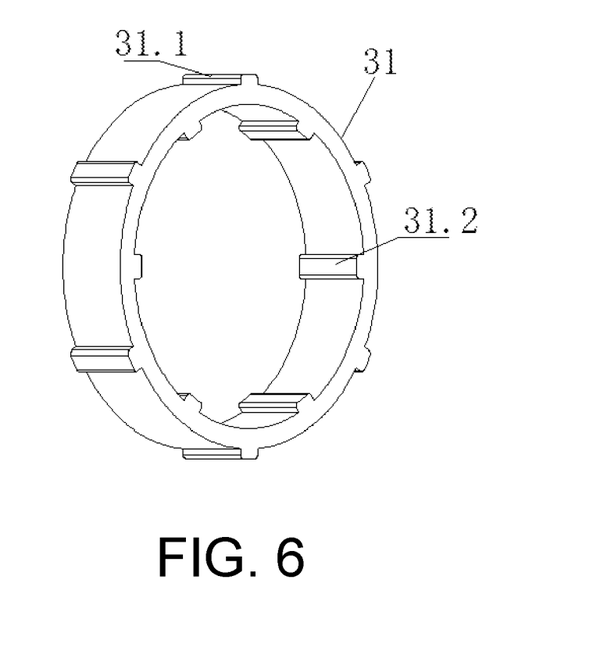
FIG. 6 is a structural schematic diagram of an elastic support cylinder.
Figure 7:
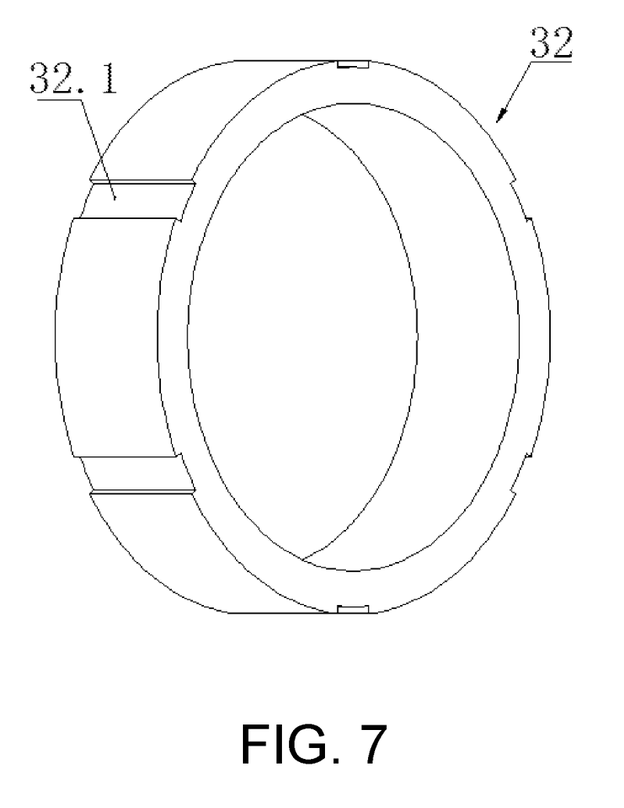
FIG. 7 is a structural schematic diagram of a bearing pedestal.

The elastic support rotating assembly 3 comprises an elastic support cylinder 31 installed in the inner cavity of the radial support locating cylinder 24 by circumferential location fit, a bearing pedestal 32 installed in the inner cavity of the elastic support cylinder 31 by circumferential location fit and a bearing 33 compressed in the bearing pedestal 32, wherein the inner ring of the bearing 33 is sleeved on the wheel axle sleeve 11. The elastic support cylinder 31, the bearing pedestal 32 and the bearing 33 are sleeved from outside to inside in sequence, and the elastic support cylinder 31 is circumferentially positioned in the inner cavity of the radial support locating cylinder 24 to ensure that the elastic support rotating assembly 3 can rotate with the rotation of the motor side adapting flange 2. The arrangement of the bearing 33 enables the motor side adapting flange 2 and the wheel axle side adapting flange 1 to rotate relatively. Because the wheel axle side adapting flange 1 and the motor side adapting flange 2 can rotate relatively to facilitate installation of the metal-rubber parts 4, only the last metal-rubber part needs to be pre-compressed in the installation process of the plurality of metal-rubber parts 4. After installation, the pre-compression of each metal-rubber part can be realized through circumferential elastic stability. The installation process is convenient and simple, and the metal-rubber parts can be installed and removed separately, which is convenient for maintenance and replacement.

The outer wall of the elastic support cylinder 31 is provided with axial locating bulges I 31.1, the inner wall of the radial support locating cylinder 24 is provided with axial grooves I 24.1 matched with the locating bulges I 31.1, the inner wall of the elastic support cylinder 31 is provided with axial locating bulges II 31.2, the bearing pedestal 32 is provided with axial grooves II 32.1 matched with the locating bulges II 31.2, the locating bulges I 31.1 are matched with the axial grooves I 24.1 to make the elastic support cylinder 31 in circumferential location fit with the radial support locating cylinder 24, the locating bulges II 31.2 are matched with the axial grooves II 32.1 to make the elastic support cylinder 31 in circumferential location fit with the bearing pedestal 32, the locating bulges I 31.1 and the locating bulges II 31.2 are uniformly and alternately distributed along the circumferential direction of the elastic support cylinder 31, and the elastic support cylinder 31 is made of spring steel. As shown in FIG. 6, the outer wall of the elastic support cylinder 31 is provided with locating bulges I 31.1, the inner wall is provided with locating bulges II 31.2, the locating bulges I 31.1 and the locating bulges II 31.2 are uniformly and alternately distributed, i.e., one locating bulge II 31.2 is arranged between two locating bulges I 31.1, one locating bulge I 31.1 is also arranged between two locating bulges II 31.2, the distance between the adjacent locating bulges I is equal to that between the adjacent locating bulges II, an elastic support beam is formed between the adjacent locating bulge I and locating bulge II, and each locating bulge I or locating bulge II is located between two elastic support beams to effectively bear the weight of the motor so as to ensure that the coupling has greater radial bearing capacity. Meanwhile, the elastic support cylinder 31 is made of spring steel and has certain elastic buffering capacity so as to effectively reduce the radial vibration of the wheel axle side adapting flange 1 and the motor side adapting flange 2 and obtain better damping buffering effects while achieving great radial bearing capacity.

In the stiffness design method for the coupling for axle-suspended installation of a direct drive motor, the initial stiffness of circumferential elastic connection between the wheel axle side adapting flange 1 and the motor side adapting flange 2 is designed according to the damping buffering requirements of the coupling for axle-suspended installation of a direct drive motor in the torsional direction in use, and the stiffness of the elastic support rotating assembly 3 is designed according to the radial bearing and damping requirements of the coupling for axle-suspended installation of a direct drive motor in use.

The design of the initial stiffness of circumferential elastic connection between the wheel axle side adapting flange 1 and the motor side adapting flange 2 refers to the design of the quantity and initial stiffness value of the metal-rubber parts 4, while the design of the initial stiffness value of the metal-rubber parts 4 refers to the design of the circumferential thickness, material and pre-compression amount of the rubber blocks 41 and the addition of partition plates 43 to the rubber blocks 41 according to the stiffness requirements.

The design of the stiffness of the elastic support rotating assembly 3 refers to the design of the structure, axial height, radial thickness and material of the elastic support cylinder 31 in the support rotating assembly, while the design of the structure of the elastic support cylinder 31 refers to the determination of the quantity of the locating bulges I 31.1 and the quantity of the locating bulges II 31.2. In the stiffness design method, the initial stiffness of circumferential elastic connection between the wheel axle side adapting flange 1 and the motor side adapting flange 2 is designed according to the damping buffering requirements of the coupling in the torsional direction, and the stiffness of the elastic support rotating assembly 3 is designed according to the radial bearing and damping requirements of the coupling, which meets different bearing and damping requirements of the coupling in radial and torsional directions, effectively improves the damping buffering effects of the coupling, enhances the radial bearing capacity of the coupling, improves the reliability of the coupling, and extends the service life of the coupling.

The technical solutions of the embodiments of the present invention are fully described above in combination with the drawings. It should be noted that the described embodiments are merely part of the embodiments of the present invention. Based on the embodiments in the present invention, all other embodiments obtained by those ordinary skilled in the art without contributing creative labor will belong to the protection scope of the present invention.

What is claimed is:

1. A coupling for axle-suspended installation of a direct drive motor, wherein the coupling comprises:
    a wheel axle side adapting flange configured for coaxially fixing with a wheel axle;
    a motor side adapting flange configured for coaxially fixing with a rotor shaft of a motor; and
    an elastic support rotating assembly, wherein the elastic support rotating assembly is radially connected between the wheel axle side adapting flange and the motor side adapting flange,
    wherein the wheel axle side adapting flange comprises a wheel axle sleeve sleeved on the wheel axle by interference fit, connecting blocks I used for circumferential elastic connection with the motor side adapting flange, and a radial connecting ring, wherein the connecting blocks I are uniformly distributed along a periphery of the wheel axle sleeve and connected with the wheel axle sleeve through the radial connecting ring,
    wherein the motor side adapting flange comprises a connecting cylinder coaxially and fixedly connected with the rotor shaft of the motor and connecting blocks II used for circumferential elastic connection with the wheel axle side adapting flange, wherein the connecting blocks II are fixed on a periphery of the connecting cylinder and uniformly distributed on the periphery of the connecting cylinder in one-to-one correspondence to the connecting blocks I, and the connecting blocks II and the corresponding connecting blocks I are circumferentially separated and elastically connected,
    wherein the connecting cylinder is sleeved with a radial support locating cylinder, the connecting blocks II are arranged on the peripheral surface of the radial support cylinder and integrated with the radial support cylinder, the axial height of the radial support locating cylinder is greater than that of the connecting cylinder, and an elastic support rotating assembly is coaxially installed in an inner cavity of the radial support locating cylinder and sleeved on the wheel axle sleeve,
    wherein the elastic support rotating assembly comprises an elastic support cylinder installed in the inner cavity of the radial support locating cylinder by circumferential location fit, a bearing pedestal installed in an inner cavity of the elastic support cylinder by circumferential location fit and a bearing compressed in the bearing pedestal, wherein the inner ring of the bearing is sleeved on the wheel axle sleeve.

2. The coupling for axle-suspended installation of a direct drive motor according to claim 1, wherein the connecting blocks II and the corresponding connecting blocks I are elastically connected through metal-rubber parts, and the metal-rubber parts are circumferentially compressed between the connecting blocks II and the corresponding connecting blocks I.

3. The coupling for axle-suspended installation of a direct drive motor according to claim 2, wherein the metal-rubber parts comprise arc-shaped rubber blocks and metal connectors vulcanized and bonded on both arc-shaped ends of the rubber blocks, the connecting blocks I and the connecting blocks II are respectively axially positioned and fixedly connected with the metal connectors through bolts, and the rubber blocks are circumferentially arranged and compressed between two metal connectors.

4. The coupling for axle-suspended installation of a direct drive motor according to claim 3, wherein the metal connectors are in right-angled fit and contact with the connecting blocks I and the connecting blocks II, the metal connectors are provided with radial bulges, the connecting blocks I and the connecting blocks II are respectively provided with radial grooves matched with the radial bulges, the radial grooves are matched with the radial bulges to axially position the metal connectors respectively with the connecting blocks I and the connecting blocks II, and partition plates arranged radially are vulcanized in the rubber blocks.

5. The coupling for axle-suspended installation of a direct drive motor according to claim 1, wherein the outer wall of the elastic support cylinder is provided with axial locating bulges I, the inner wall of the radial support locating cylinder is provided with axial grooves I matched with the locating bulges I, the inner wall of the elastic support cylinder is provided with axial locating bulges II, the bearing pedestal is provided with axial grooves II matched with the locating bulges II, the locating bulges I are matched with the axial grooves I to make the elastic support cylinder in circumferential location fit with the radial support locating cylinder, the locating bulges II are matched with the axial grooves II to make the elastic support cylinder in circumferential location fit with the bearing pedestal, the locating bulges I and the locating bulges II are uniformly and alternately distributed along a circumferential direction of the elastic support cylinder, and the elastic support cylinder is made of spring steel.

6. A stiffness design method for the coupling for axle-suspended installation of a direct drive motor according to claim 1, wherein the initial stiffness of circumferential elastic connection between the wheel axle side adapting flange and the motor side adapting flange is designed according to the damping buffering requirements of the coupling for axle-suspended installation of a direct drive motor in the torsional direction in use, and the stiffness of the elastic support rotating assembly is designed according to the radial bearing and damping requirements of the coupling for axle-suspended installation of a direct drive motor in use.

\* \* \* \* \*